INVENTORS.
WILLIAM F. BARTLETT
BARRIE BRIGHTMAN
BY George W. Killian
AGENT

United States Patent Office 3,334,181
Patented Aug. 1, 1967

3,334,181
PARALLEL TO SERIAL CHARACTER CONVERTER APPARATUS

William F. Bartlett, Rochester, and Barrie Brightman, Webster, N.Y., assignors to General Dynamics Corporation, Rochester, N.Y., a corporation of Delaware Filed Aug. 21, 1963, Ser. No. 303,630
11 Claims. (Cl. 178—50)

ABSTRACT OF THE DISCLOSURE

This invention relates in general to data processing equipment and, more particularly, to means for converting time division multiplexed signals to coded signals of the form generally used to operate teletypewriter equipment.

Figure 1:
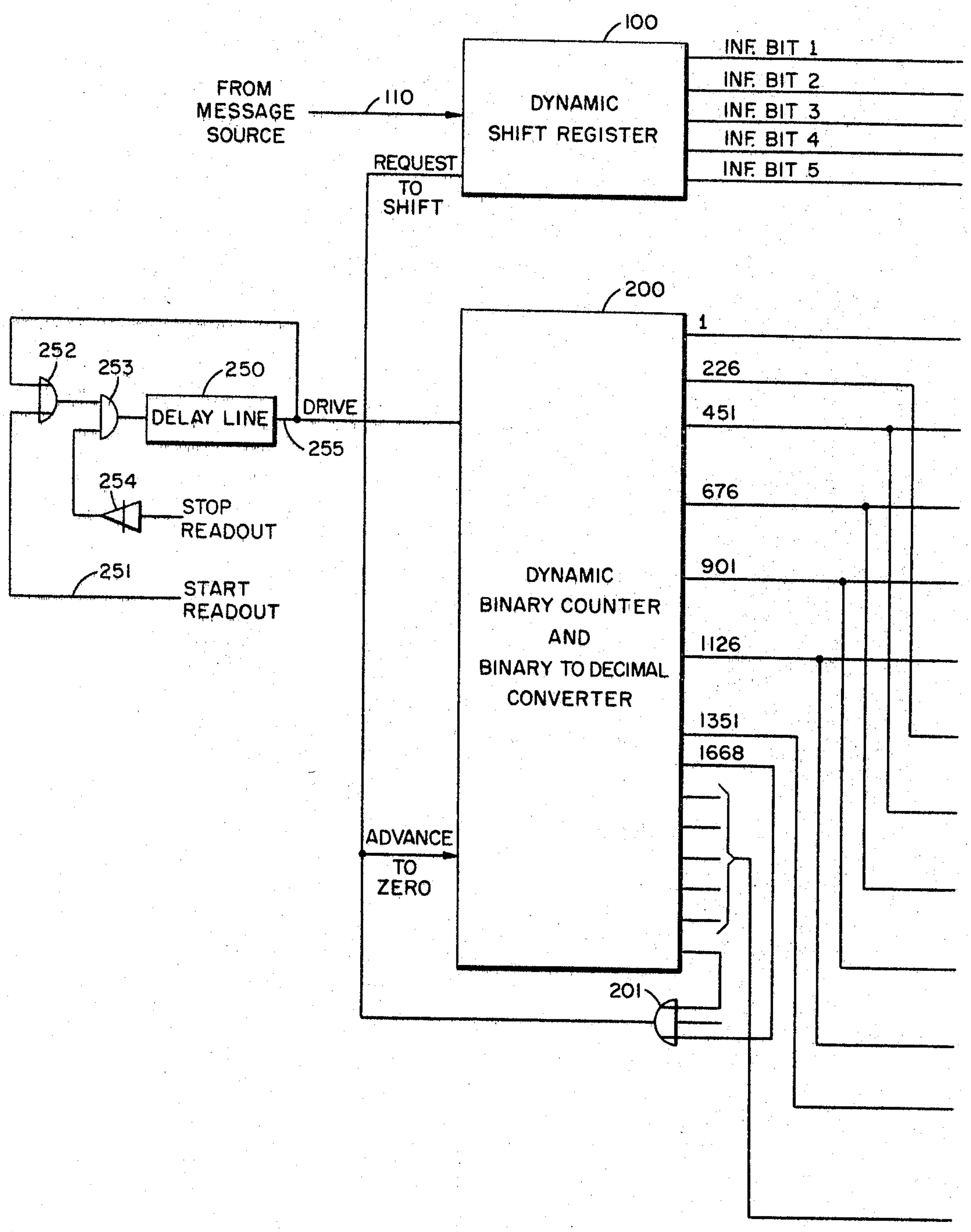

The invention herein disclosed may find utility in a wide variety of devices; however, it is particularly well adapted for use in teletype message switching system wherein it is desired to translate and/or reconstruct the individual information bits comprising a character so that they are acceptable to the read-in device of the outgoing line unit. That is, in some cases, it is expedient to receive messages at one rate and to retransmit the message at some other rate. In other cases, it is expedient to receive a message signal in one form, converted to another form for temporary storage and to subsequently reconstruct and transmit the message signal in the original form or another form at the same or another rate.

It is the general object of this invention to provide a new and improved means for converting signals from a first coded form to a second coded form.

It is a more particular object of this invention to provide a new and improved means for producing coded signals in a serial form in response to the receipt of coded signals in a parallel form.

It is another object of this invention to provide new and improved means for producing coded signals in a selected serial form in response to the receipt of coded signals in a parallel form.

It is another object of this invention to provide means for producing teletypewriter type signals at any selected information bit per second rate in response to the receipt of time division multiplexed signals.

It is another object of this invention to provide means for converting time division multiplexed signals to teletypewriter type signals at a predetermined information bit per second rate.

It is another object of this invention to provide means for translating coded time division multiplexed signals in parallel form to serial codes of the teletypewriter type.

In accordance with the present invention, a bistable control circuit is provided for applying one or the other of two signals to a transmission line. That is, when the bistable circuit is set to a first of its bistable states, a signal indicative of a "1" may be applied to the line; and when the bistable circuit is set to the second of its stable states, a signal indicative of a "0" may be applied to the line. Or, if desired, the applied signals may be considered to be indicative of marks and spaces, or dots and dashes, et cetera. The inventive concept disclosed herein is particularly well-suited for applying signals to said transmission line in a coded system wherein each character to be transmitted over said line is made up of a predetermined number of elements. The teletypewriter code illustrated on page 100 of "Principles of Electricity Applied to Telephone and Telegraph Work," 1953 Edition, by American Telephone and Telegraph Company, is an example of such a code. More specifically, the teletypewriter code is one in which each letter or signal is made up of a predetermined number of units, or information elements, of equal length. In addition, there is a start and stop signal with the former having a duration equal to that of each of the predetermined information elements and the latter having a duration of approximately 1.42 of the other elements. The predetermined number of code elements may be any combination of marks or spaces, while the start and stop units are always a space and a mark, respectively. The rate of transmission may be controlled by adjusting the elapsed time for the transmission of each element. Naturally, the transmitting and receiving units at each end of a given transmission line must be synchronized and adjusted for operating at the same speeds.

As stated, a bistable circuit is employed to apply a first or second signal to the transmission line. A counting circuit which is driven at a known rate is employed to control the times at which the bistable circuit may be set or reset. More specifically, for low speed transmission, the counter is caused to enable the bistable circuit to be set or reset at relatively infrequent intervals; while for high speed transmission, the counter is caused to enable the bistable circuit to be set or reset at relatively frequent intervals.

The message to be transmitted is read from a storage medium, such as that disclosed in the copending application of the same inventors and assigned to the same assignee as the present invention and having Ser. No. 303,518, filed Aug. 21, 1963. The message, or a portion thereof, may be registered in an assigned time slot of a dynamic shift register which is arranged in such a manner that once each time frame a signal indicative of each of the predetermined number of information units of the teletype code are simultaneously presented on a number of output leads equal to said predetermined number. The output leads from the register are coupled to the bistable circuit in such a manner that each lead, in its turn, will enable the bistable circuit to be set or reset, as may be required. Although the code to be reconstructed could have any number of information units per character it will be assumed that a five unit code is used.

After all five of the information units, comprising a character, have in their turn caused said bistable circuit to be set, reset, remain set, or remain reset, as the case may be, the counter provides a signal to advance the counter to zero and to cause the register to shift so that signals indicative of the next character are presented. Thereafter, the signals indicative of a next character are caused to set or reset the bistable circuit in the same manner with each of the five information unit successively enabled to do so at a rate controlled by the counter.

Further objects and advantages of the invention will become apparent as the following description proceeds, and features of novelty which characterize the invention will be pointed out in particularity in the claims annexed to and forming a part of this specification.

Figure 2:
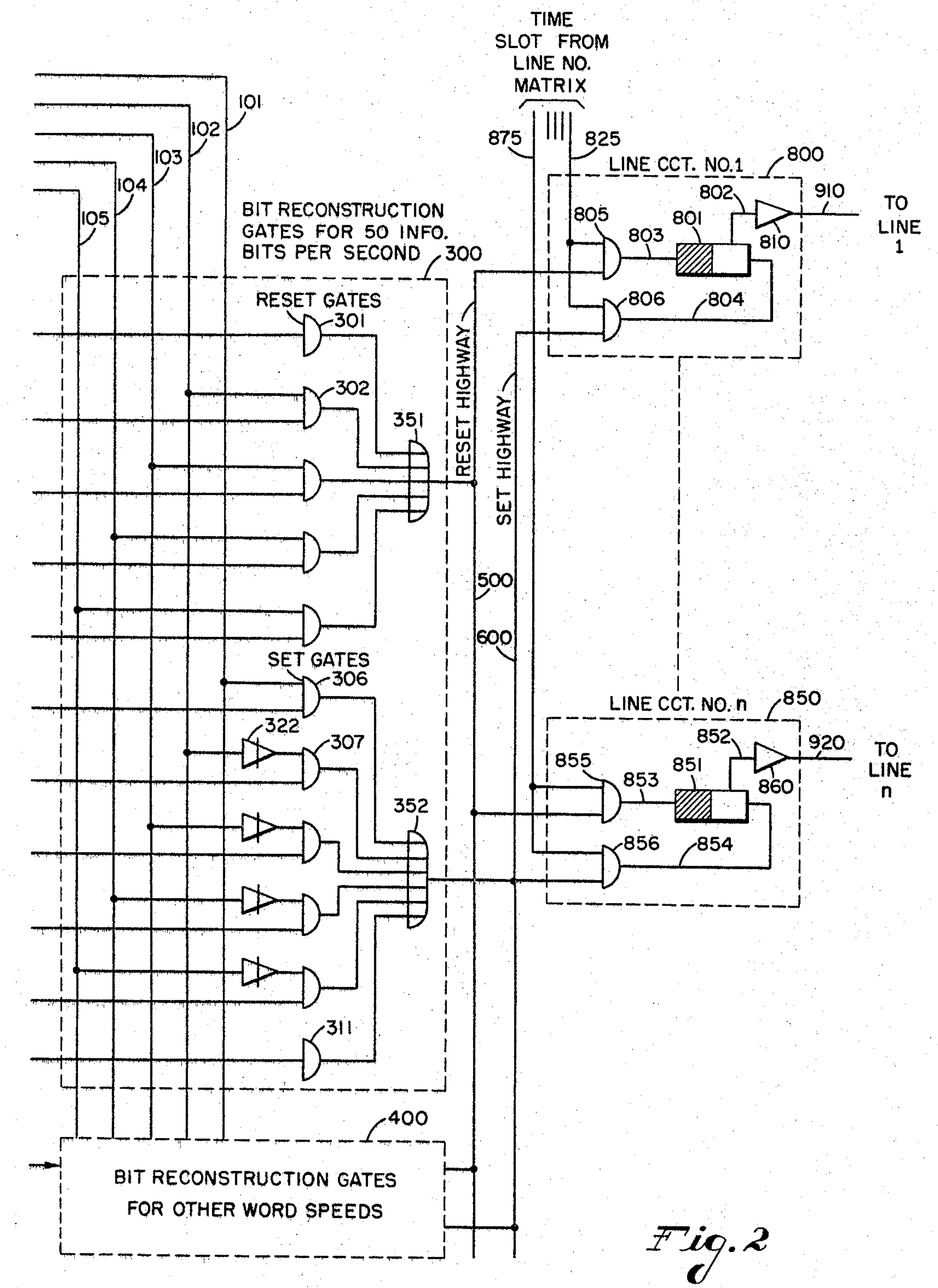

For a better understanding of the invention, reference may be had to the accompanying drawings in which FIGS. 1 and 2, when arranged side-by-side in numerical order, illustrate the invention in logic diagram form.

For convenience, the invention disclosed herein is illustrated in block and logic diagram form as it is believed that the inclusion of well-known and unnecessary circuit detail would only tend to mask or obscure the inventive concept disclosed herein.

The invention employs a shift register which may be of the type disclosed and claimed in the copending application of the same inventors and assigned to the same assignee as the present invention, and which was issued Sept. 27, 1966 and assigned Patent No. 3,275,993. For understanding the illustrated embodiment of the present invention, it must be understood that the information is entered in the shift register 100 on lead 110 and that the information is recirculated once each time frame in the register. It will be assumed that each piece of information, such as characters, figures, etc., is represented by five information units or information bits. In addition to the five information bits, a start and stop unit is used for synchronizing and/or other purposes. The shift register provides time division multiplexed output signals indicative of the five information bits for the first character entered in the register on the five output leads, designated 101 to 105, once each time frame is in an assigned time slot.

The invention also employs a dynamic binary counter and binary-to-decimal converter 200 which may be driven once per time frame, or any other suitable interval, in any or all of the time slots of the time division multiplex system by a pulse recirculated in one or more of the time slots of delay line 250. The counter 200 provides on a selected one of its plurality of output leads, only a few of which are illustrated as emerging from the righthand side of the counter 200, a time slot pulse indicative of the total number of input or drive pulses received in that time slot since the counter was last reset. That is, as successive drive pulses are applied in a given time slot, a pulse will be applied successively to a selected one of the output leads in the given time slot which is indicative of the total number of drive pulses. Thus, in successive time frames, output signals indicative of 1, 2, 3, etc., will be provided. If a drive pulse is provided at known regular intervals, the particular output lead to which a signal is applied will be indicative of the elapsed time since the counter was reset. The counter, being dynamic, may have completely different counts in each of the time slots and be individually reset in any time slot. Counters and converters having the described characteristics are well known to those skilled in the art and, therefore, the details thereof have not been illustrated as it is believed that to do so would unnecessarily complicate the disclosure without contributing to the understanding of the inventive concept disclosed herein.

In addition to the register 100 and the counter 200, there are illustrated various AND and OR gates, amplifiers, inverters, and flip-flops in logic diagram form. The circuits for these elements are all well known in the art. Typical examples of circuits for these logic elements may be seen in the Barrie Brightman Patent No. 2,979,570, issued on Apr. 11, 1961.

AND gates are represented in the drawings by a symbol which has the general shape of a D. The inputs to an AND gate are drawn to the straight line part of the D, while the output is drawn from the arcuate portion of the D. All the AND gates illustrated in the drawings are of the type that will provide a negative output potential only when all the inputs are negative. When any one or more of the inputs to an AND gate are positive, the output potential will rise to a more positive potential.

OR gates are similar in appearance to AND gates, but are distinguished therefrom by having the input leads extend beyond the straight line portion of the D and to the arcuate portion. All the OR gates illustrated in the drawings are of the type that will provide a negative output potential when one or more of the inputs are negative. When all of the inputs to an OR gate are positive, the output potential will rise to a more positive potential.

Amplifiers are represented by an isosceles triangle with the input at the base and the output at the apex. The amplifiers used in the illustrated embodiment of the invention provide a ground or positive output signal at all times except when a negative input signal is applied to the input of the amplifier. Accordingly, the application of a negative signal to the input of the amplifier causes the amplifier to remove an inhibiting ground potential.

Inverters are similar in appearance to the amplifiers, but have an additional line which is equal in length to the base of the triangle and is drawn parallel to the base and bisected by an imaginary altitude of the triangle. The inverter used in the illustrated embodiment of the invention provides a negative output signal at all times except when a negative input signal is applied to the input of the inverter. Accordingly, the application of a negative input signal to the input of the inverter causes the inverter to produce an inhibiting or ground output signal.

Flip-flop circuits are represented by a rectangle divided into two squares, to represent the two portions of a typical flip-flop circuit. The square representing the reset portion of the flip-flop is shaded, while the square representing the set portion of the flip-flops is not shaded. The input signals to reset or set the flip-flops are applied to the shorter sides of the rectangle. The flip-flops used in the illustration are of the type which respond only to positive transients of input signals. When a flip-flop has been reset by a positive transient, a steady state ground marking potential is provided on an output lead from the reset side of the flip-flop and a steady state negative marking potential is provided on an output lead from the set side of the flip-flop. When the flip-flop is set, the marking potentials on the output leads are reversed.

It is believed that the operation of the illustrated embodiment of the invention can best be understood by describing in detail the action which takes place from the time that time division multiplexed signals indicative of the information bits comprising a message are delivered to the register 100 until coded signals of the type commonly used in teletypewriter systems are applied to one of the transmission lines, such as 910 or 920. For this purpose, it will be assumed that it is desired to transmit messages on transmission line 910 at a rate of fifty information bits per second in a code format wherein each character comprises five information bits and a start and stop bit with the former having a duration equal to that of an information bit and the latter has a duration of 1.42 information bits. Thus, a transmission speed of fifty information bits per second is equal to a speed of ten characters per second which allows one hundred milliseconds per character. With this code format, each start and information bit will have to be transmitted for approximately 13.5 milliseconds, while the stop pulse will have to be transmitted for approximately nineteen milliseconds. If it is assumed that the time division multiplex equipment operates with a sixty microsecond time frame, it means that a one hundred millisecond character has a duration of 1667 time frames and that each information bit and the start bit will have a time duration of approximately 225 time frames, while the stop pulse will have a time duration of approximately 319 time frames. Accordingly, by applying an appropriate signal to transmission line 910 for a time period equal to 225 time frames wherein the applied signal is indicative of the first information bit delivered from the shift register 100 and doing the same with each of the other information bits, it is possible to reconstruct a teletype type code from time division multiplexed signals. To transmit at any other speed, all that is required is to alter the time period to the appropriate signal that is applied to the transmission lead.

For convenience, these signals that are transmitted on transmission lines 910 or 920 will be referred to as spaces when flip-flop 801 in line circuit 800 has been reset. That is, when a pulse is applied on lead 803, to reset flip-flop 801 a negative output potential will be applied on lead 802. The negative potential applied to amplifier 810 will cause a negative potential to be applied to line 910. In a similar manner, signals that are transmitted on line 910 will be referred to as marks when flip-flop 801 has been set by the application of a pulse to lead 804. That is, when flip-flop 801 is set, a positive potential will be applied to lead 802 by flip-flop 801 and thereby cause amplifier 810 to apply a positive pulse to the line 910.

It is further assumed, in the illustrated case, that the start pulse is to be a space signal and that the stop pulse will be a mark signal. The five information bits may be any combination of marks and spaces, depending upon the particular character or information represented thereby.

Each message that is registered, reconstructed and transmitted by the system will be assigned a particular time slot within the repetitive time frame of the time division multiplex portion of the system. Thereafter, any time division multiplex signals relating to or controlling that message will be provided in that particular time slot. For the purposes of explanation, it will be assumed that the assigned time slot for the message under consideration is time slot 8 and that the message is to be transmitted at a rate of fifty information bits per second through line circuit 800. Accordingly, AND gates 805 and 806 are arranged to be enabled to pass signals only in the eighth time slot by providing an enabling pulse in the eighth time slot on lead 825 in each of the repetitive time frames. The time slot pulses on lead 825 may be provided from any convenient source, such as the memory which has recorded therein the assignment of time slot 8 to the particular message under consideration. Such a memory is frequently called a line number matrix. In a similar manner, the AND gates 855 and 856 of line circuit 850 may be enabled in an appropriate time slot by pulses on lead 875.

After a suitable amount of information concerning the message to be transmitted through line circuit 800 has been stored in the eighth time slots of the register 100, a pulse will be applied to lead 251 in the eighth time slot as a start to read out signal. From that time on, the message will be registered, reconstructed and transmitted without interruption until the complete message has been transmitted.

The time slot pulse applied to lead 251 will pass through OR gate 252 to AND gate 253 which is enabled by inverter 254 as long as a negative pulse is not applied to the input of inverter 254. Therefore the start readout pulse will enter delay line 250 which has a time delay of one time frame, which is assumed to be sixty microseconds. Accordingly, one time frame later a time slot pulse in time slot 8 will emerge on lead 255 and be reapplied to OR gate 252 to be recirculated in delay line 250. Therefore the pulse entered in delay line 250 in time slot 8 will be recirculated once each time frame until a negative stop signal is applied to the input of inverter 254. In addition, once each time frame the pulse in the eighth time slot will be applied to counter 200. For the present, it should be assumed that the counter has been previously set to zero in the eighth time slot, and it will be seen later that this is the natural result of having reconstructed the previous message.

From the foregoing, it may be seen that the counter 200 will have a time slot pulse applied thereto once each time frame in the eighth time slot and, therefore, when the first time slot pulse is applied thereto the output of the counter 200 will advance to 1. In response tothe next pulse in time slot 8 from delay line 250, the output of the counter will advance to 2, and so on for pulse after pulse.

As will be seen later, flip-flop 801 will have been previously set thereby applying a mark pulse to line 910 before the counter 200 was reset to its home or zero position. In response to the output pulse on lead 1 from counter 200, a pulse will be passed through AND gate 301 and OR gate 351 to the reset highway 500. The pulse applied to the reset highway 500 will, of course, be in time slot 8 and will be applied as an input to AND gates 805 and 855 as well as to other similar gates serving other line circuits, not illustrated. However, only AND gate 805 in line circuit 800 will be enabled during the eighth time slot as an enabling time slot pulse is applied to lead 825 in the time of the eighth time slot. Accordingly, when the counter produces an output signal of one, the flip-flop 801 will be reset thereby starting the transmission of a space signal on line 910. The space signal being transmitted is the start signal for the first character and, as previously explained, the space signal must last for approximately 13½ milliseconds or 225 time frames for the assumed transmission rate of fifty information bits per second. The bistable flip-flop 801 having been reset by the time division multiplex pulse on lead 1 from the counter 200 will remain reset until set by some later signal. Therefore, in response to a single time division multiplex pulse, a space signal has been reconstructed for transmission on line 910. In the assumed code format, all start signals are space signals and therefore the pulse on output lead 1 from the counter 200 will always reset the flip-flop 801 of the assigned line circuit to cause the initiation of the transmission of a space signal.

The counter 200 will be advanced step-by-step in response to each pulse in time slot 8 from delay line 250 until finally the counter produces an output pulse on lead 226 at a time 225 time frames after the pulse on lead 1. As may be seen from the drawings, the pulse on lead 226 is applied as an input to AND gate 306. Lead 101 from register 100 provides another input to AND gate 306. At this time it should be recalled that a portion of the coded message is registered in shift register 100 and that time division multiplexed signals indicative of the five information bits of the first character are presented once each time frame in the eighth time slot on the five output leads 101 to 105 with the time division multiplex signal indicative of the first information bit being applied to lead 101, and so on with the time division multiplex signal indicative of the fifth information bit being applied to lead 105. Thus, at the same time that a pulse is applied to lead 226 indicating the end of the transmission time for the start pulse and the start of the transmission time for the first information pulse, a pulse indicative of the intelligence of the first information bit is applied to lead 101. If the first information bit is to be a space pulse, the signal on lead 101 will have a positive potential; while if the first information bit is to be a mark pulse, the signal on lead 101 will have a negative potential. In a similar manner, the other information bit leads will have a positive or a negative potential applied thereto to indicate space and mark signals, respectively, for each of the other information bits.

Since the start signal is always a space signal, it is only necessary to change the flip-flop 801 if the first information bit is a mark. That is, if the first information bit is to be a space signal, it is not necessary to apply a time division multiplex signal to flip-flop 801 in the eighth time slot of the 226th time frame. Therefore, if the first information bit is a space, a positive potential will be applied to lead 101 and AND gate 306 will not be enabled to pass a pulse and therefore flip-flop 801 will not have any signal applied thereto. However, if the first information bit is to be a mark, a negative potential will be applied to lead 101 by the register 200 and AND gate 306 will be enabled to pass a pulse which, in turn, will pass through OR gate 352 to the set highway 600. The pulse on the set highway 600 will be in the eighth time slot and therefore will pass through AND gate 806 which is enabled by a pulse on lead 825 to set flip-flop 801. As previously stated, when flip-flop 801 is set, a mark pulse will be applied to line 910. The pulse indicative of the intelligence of the first information bit must be applied to the transmission line 910 for a time duration of 225 time frames. Accordingly, the time division multiplexed signal applied to lead 101 has been reconstructed into a mark or space signal as may have been required and has been transmitted for 225 time frames.

The counter 200 will be advanced step-by-step in response to the successive pulses in time slot 8 from delay line 250 until finally the counter produces an output pulse on lead 451. As may be seen from the drawings, the pulse on lead 451 is applied as an input to AND gates 302 and 307. Simultaneously, the pulse on lead 102 which is indicative of the second information bit will be applied to AND gate 302 and the inverse thereof will be applied to AND gate 307. That is, inverter 322 causes the inverse of the signal on lead 102 to be applied to gate 307. Accordingly, if the time division multiplexed signal on lead 102 is negative, AND gate 302 is enabled; while if the time division multiplexed signal on lead 102 is positive, AND gate 307 is enabled. In the former case, a pulse will be applied to reset highway 500 to cause a space to be transmitted on the line 910, while in the latter case a pulse will be applied to the set highway 600 to cause a mark signal to be transmitted on the line 910.

In the manner just described, the time division multiplexed pulses indicative of the third, fourth and fifth information bits will cause a pulse to be selectively applied to either the reset highway 500 or the set highway 600, each at the proper times as controlled by the output pulses from the counter 200.

When the counter 200 has been advanced to a count of 1351, a pulse will be passed through AND gate 311 and OR gate 352 to the set highway 600 to cause a mark pulse indicative of the stop signal to be transmitted on line 910. No provision is made to permit the pulse on lead 1351 to transmit a space signal as the stop signal is always a mark pulse.

Finally, when the counter has advanced to the 1668th time frame, a pulse will be passed through OR gate 201 in the eighth time slot to reset the counter to zero and to provide a shift signal to the register 100. In response to the shift signal, the register 100 will inhibit the recirculation of the information bits relating to the first character which had recirculated for 1668 time frames and the information bits indicative of the second character will be presented in the eighth time slot on the five output leads from the register 100.

The continued pulses in the eighth time slot in each time frame will again advance the counter 200, and the start, information bits, and the stop signal for the second character will be read out and reconstructed into mark and space pulses and transmitted at the desired speed just as for the first character.

Since each character ends with a stop pulse which is always transmitted as a mark pulse, the flip-flop 801 is in its reset state when the counter is advanced to 1.

As the characters are read out of the shift register 100, others are entered therein on lead 110, all as explained in the cited application relating to the shift register. Normally, there is no delay and once the transmission is started it is continued character-by-character to the end of the message. There is no wait for the message from the source as it has already been completely received and registered in a temporary store, such as that described in the cited copending application of the same inventors, filed on the same date herewith. Finally, when the message has been fully transmitted, a stop signal is applied as an input to inverter 254 which inhibits the recirculation of the pulse in delay line 250 and thereby stops the counter 200.

Of course, it must be understood that at the same time that the system is operating in time slot 8 to transmit one message that it may also be operating in one or more of the other time slots to read out, reconstruct, and transmit other messages. One or more line circuits may be assigned to a given speed of transmission. Furthermore, if it is desired to transmit the same message to two different locations at the same speed, two line circuits similar to line circuit 800 could be enabled in the same time slot.

The five information bit leads from register 100 must be multipled to each of the bit reconstruction gates for each of the desired speeds. Each set of reconstruction gates are enabled by appropriate leads from the counter. A reconstruction gate which controls higher speed transmission will be connected to output leads from the counter which have smaller numbers as a smaller number of time frames must elapse during the transmission of each mark and space pulse.

If a lower transmission speed is used, it would be possible to drive the ccunter by a different drive means which provides drive signals less frequency and which would thereby permit the use of a counter which is not required to have the capacity to count to such high numbers.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a data handling system, which cooperates with a data transmission line, and which includes a source of time division multiplexed signals for providing and repeating signals in a given time slot of a repetitive time frame which are indicative of first or second characteristics of each of the predetermined number of information bits in a code character wherein each character is represented by said predetermined number of information bits, the improvement comprising bistable control means coupled to said transmission line for applying first and second signals to said line in response to said control means being set to its first or second stable states, respectively, and coupling means coupling said source and said bistable control means in a manner to cause a selected one of said repetitive signals to set said control means to its first or second bistable states only when the selected signal is indicative of said first or second characteristic, respectively, said coupling means including counting means for counting the number of times the signals indicative of the information bits comprising a given character are presented by said source to said coupling means.

2. The combination as set forth in claim 1 wherein said counting means enables signals indicative of the characteristics of the first and second information bits of said given character to be coupled to said control means only when said counter has determined that said signals indicative of first and second characteristics have been presented to said coupling means a first and second specific number of times, respectively.

3. The combination as set forth in claim 2 wherein signals indicative of the characteristics of each of the information bits comprising said given character are successively coupled to said control means.

4. The combination as set forth in claim 3 wherein means are included in said counter for coupling the signals to said control means at fixed intervals under the control of said counting means.

5. The combination as set forth in claim 4 wherein means are coupled to said counter for resetting said counter to an initial setting after signals indicative of all the information bits of said given character have been coupled to said control means.

6. The combination as set forth in claim 5 wherein said coupling means includes means to cause said source to provide signals in said given time slot of the repetitive time frames which are indicative of the first or second characteristics of each of the predetermined number of information bits of another character when said counter has been reset.

7. In a data transmission system, having a transmission line, and having a data signal source for providing a plurality of signals at regular repetitive intervals, the improvement comprising control means including bistable means coupled to said transmission line for applying first and second signals to said transmission line when said control means is set to its first and second stable states, respectively, enabling means coupled to said control means, timing means for providing control pulses at predetermined intervals which are integer multiples of said regular intervals, said timing means and said data signal source coupled to said enabling means for enabling said enabling means to produce an output signal only when said timing means and said data signal source apply signals thereto concurrently.

8. In a data transmission system which is cooperative with a transmission line, and which includes a source for providing digital signals representative of a particular character on a plurality of output lines during a predetermined time slot of a repeating time frame, a parallel-to-series converter for transmitting said character at a predetermined speed comprising (a) bistable means coupled to said transmission line for applying a first or a second signal to said transmission line representative of different ones of its stable states, said bistable means being responsive to first and second actuation signals for switching said bistable means to said first and second states, (b) a plurality of bit transfer gates each coupled to a different one of said output lines and each of which when enabled is adapted to couple its output line to said bistable means for providing one of said first and second actuating signals to said bistable means, and (c) counting means for providing a series of successive outputs, each said output being provided after a predetermined number of successive time frames and in coincidence with said time slot and each of said counting means output being applied as an input to a different one of said bit transfer gates, thereby transmitting said character at said predetermined speed.

9. The invention as set forth in claim 8 including means responsive to outputs of said counting means for actuating said bistable means at the start and the finish of the transmission of a character, thereby providing formating information for said character.

10. In a data transmission system cooperative with a transmission line and including a source for providing digital signals representative of a first and a second character on a plurality of output lines during first and second predetermined time slots of a repeating time frame, respectively, a first parallel-to-series converter for transmitting said first character at a predetermined speed and a second parallel-to-series converter for transmitting said second character at a predetermined speed, each said converter comprising (a) bistable means coupled to said transmission line for applying either a first or a second signal to said transmission line representative of a first and a second of its stable states, said bistable means being responsive to first and second actuation signals for respectively switching said bistable means to its first and second states, (b) a plurality of bit transfer gates each in communication with a different one of said output lines and each of which when enabled is adapted to couple its output line to said bistable means for providing the actuating signals to said bistable means, and (c) counting means for providing a series of successive outputs, each of said outputs being provided after a predetermined number of successive time frames and in coincidence with said time slot and each of said counting means output being applied as an input to a different one of said bit transfer gates, thereby transmitting said character at said predetermined speed.

11. The invention as set forth in claim 22 wherein each said converter includes means responsive to outputs of said counting means for actuating said bistable means at the start and the finish of the transmission of a character, thereby providing formating information for each said character.

References Cited

UNITED STATES PATENTS

| | | | |
|---|---|---|---|
| 2,905,930 | 9/1959 | Golden ----------- | 340—172.5 |
| 3,229,258 | 1/1966 | Heibeck et al. ------ | 340—172.5 |

JOHN W. CALDWELL, *Acting Primary Examiner.*

J. T. STRATMAN, *Assistant Examiner.*